US009066003B2

(12) United States Patent
Sugimoto et al.

(10) Patent No.: US 9,066,003 B2
(45) Date of Patent: Jun. 23, 2015

(54) APPARATUS FOR ADJUSTING AUTOFOCUS USING LUMINANCE CORRECTION AND METHOD OF CONTROLLING THE SAME

(71) Applicant: SAMSUNG ELECTRONICS CO., LTD., Suwon-si, Gyeonggi-do (KR)

(72) Inventors: Kazuhiko Sugimoto, Seongnam-si (KR); Jin-ok Ha, Suwon-si (KR); Young-ha Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 13/684,685

(22) Filed: Nov. 26, 2012

(65) Prior Publication Data
US 2013/0135520 A1 May 30, 2013

(30) Foreign Application Priority Data
Nov. 24, 2011 (KR) .................. 10-2011-0123666

(51) Int. Cl.
*H04N 5/232* (2006.01)
*G03B 13/00* (2006.01)

(52) U.S. Cl.
CPC .................. *H04N 5/23212* (2013.01)

(58) Field of Classification Search
CPC ....... H04N 5/23212; G02B 7/36; G03B 13/36
USPC .......................................... 348/345, 349–356
See application file for complete search history.

(56) References Cited

U.S. PATENT DOCUMENTS

| 2008/0074530 A1* | 3/2008 | Okawa et al. ................. 348/345 |
| 2010/0026879 A1* | 2/2010 | Koh et al. ..................... 348/352 |
| 2010/0045848 A1* | 2/2010 | Sugimoto et al. ............. 348/347 |
| 2010/0214451 A1 | 8/2010 | Hwang et al. |
| 2011/0052173 A1* | 3/2011 | Yoshida ........................ 396/213 |
| 2012/0062785 A1* | 3/2012 | Sugimoto et al. ............. 348/345 |
| 2012/0120305 A1* | 5/2012 | Takahashi ..................... 348/352 |

* cited by examiner

*Primary Examiner* — Kelly L Jerabek
(74) *Attorney, Agent, or Firm* — Drinker Biddle & Reath LLP

(57) ABSTRACT

An apparatus for adjusting an autofocus and a method of controlling the same are provided. The apparatus includes an imaging device that photographs light from a subject so as to generate an image signal; a contrast calculation unit that calculates a first contrast value of an image from the image signal; a correction unit that corrects a luminance of the image signal if the calculated first contrast value is equal to or less than a reference value; and a focus adjustment unit that adjusts a focus by using a second contrast value that is calculated from the corrected image signal, thereby providing an improved focus adjustment function.

20 Claims, 8 Drawing Sheets

APPARATUS FOR ADJUSTING AUTOFOCUS USING LUMINANCE CORRECTION AND METHOD OF CONTROLLING THE SAME

CROSS-REFERENCE TO RELATED PATENT APPLICATION

This application claims the priority benefit of Korean Patent Application No. 10-2011-0123666, filed on Nov. 24, 2011, in the Korean Intellectual Property Office, the disclosure of which is incorporated herein in its entirety by reference.

BACKGROUND

Various embodiments relate to an apparatus for adjusting an autofocus and a method of controlling the same.

In order for a photographing apparatus, such as a camera or a camcorder, to capture a clear still image or a clear moving image, a focus on a subject needs to be accurately adjusted. Examples of a method of adjusting an autofocus that automatically performs a focus adjustment include a method of adjusting a contrast autofocus and a method of adjusting a phase difference autofocus.

According to the method of adjusting a contrast autofocus, photographing is performed by varying a location of a focus lens. In particular, the contrast autofocus adjustment method is a method whereby a contrast value of an image signal generated by an imaging device is obtained and the focus lens is driven to a focus lens location where the contrast value is a peak contrast value.

According to the method of adjusting a phase difference autofocus, a sensor, as well as an imaging device, is used, and a focus location is detected from a phase difference of light applied to the sensor.

SUMMARY

Various embodiments provide an apparatus for adjusting an autofocus which performs a method of adjusting a contrast autofocus, the apparatus having an improved performance.

Various embodiments also provide a method of controlling the apparatus.

According to an embodiment, there is provided an apparatus for adjusting an autofocus, the apparatus including: an imaging device that photographs light from a subject so as to generate an image signal; a contrast calculation unit that calculates a first contrast value of an image from the image signal; a correction unit that corrects a luminance of the image signal if the calculated first contrast value is equal to or less than a reference value; and a focus adjustment unit that adjusts a focus by using a second contrast value that is calculated from the corrected image signal.

The correction unit may correct the luminance of the image signal according to an average luminance of the image.

The correction unit may generate a luminance correction curve according to the average luminance and correct the luminance of the image signal according to the generated luminance correction curve.

A slope of an output signal with respect to an input signal of the luminance correction curve may be steep in a region of the average luminance.

The apparatus may further include a luminance calculation unit that calculates the average luminance.

The luminance calculation unit may calculate the average luminance with respect to an image of a region subjected to focus adjustment.

The first contrast value may be calculated using luminance data obtained from automatic light metering.

The first contrast value may be calculated from a histogram with respect to luminance distribution.

The apparatus may further include a filter unit that performs a filtering process on the corrected image signal.

A cut-off frequency of the filter unit may vary according to the reference value.

The cut-off frequency may decrease as the reference value decreases.

The apparatus may further include a noise removal unit that removes noise from the corrected image signal.

According to another embodiment, there is provided a method of controlling an apparatus for adjusting an autofocus, the method including: photographing light from a subject so as to generate an image signal; calculating a first contrast value of an image from the image signal; correcting a luminance of the image signal if the calculated first contrast value is equal to or less than a reference value; and adjusting a focus by using a second contrast value that is calculated from the corrected image signal.

The method may further include calculating an average luminance from the generated image signal.

The correcting of the luminance of the image signal may include generating a luminance correction curve according to the average luminance and correcting the luminance of the image signal according to the generated luminance correction curve.

The correcting may be performed such that a slope of an output signal with respect to an input signal is steep in a region of the average luminance.

According to another embodiment, there is provided an apparatus for adjusting an autofocus, the apparatus including: an imaging device that photographs light from a subject so as to generate an image signal; a contrast calculation unit that calculates a contrast value of an image from the image signal; a comparison unit that compares the calculated contrast value with a reference value; and a focus adjustment unit including a first autofocus mode that performs a general autofocus operation if the contrast value is greater than a reference value and a second autofocus mode that performs an autofocus operation for low contrast if the contrast value is equal to or less than a reference value.

The apparatus may further include a correction unit that corrects the luminance of the image signal in the second autofocus mode.

The apparatus may further include a luminance calculation unit that calculates the average luminance, wherein the correction unit corrects the luminance of the image signal according to the average luminance of an image.

The correction unit may generate a luminance correction curve according to the average luminance and correct the luminance of the image signal according to the generated luminance correction curve.

An apparatus for adjusting an autofocus having the structures described above may provide an improved focus adjustment function.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
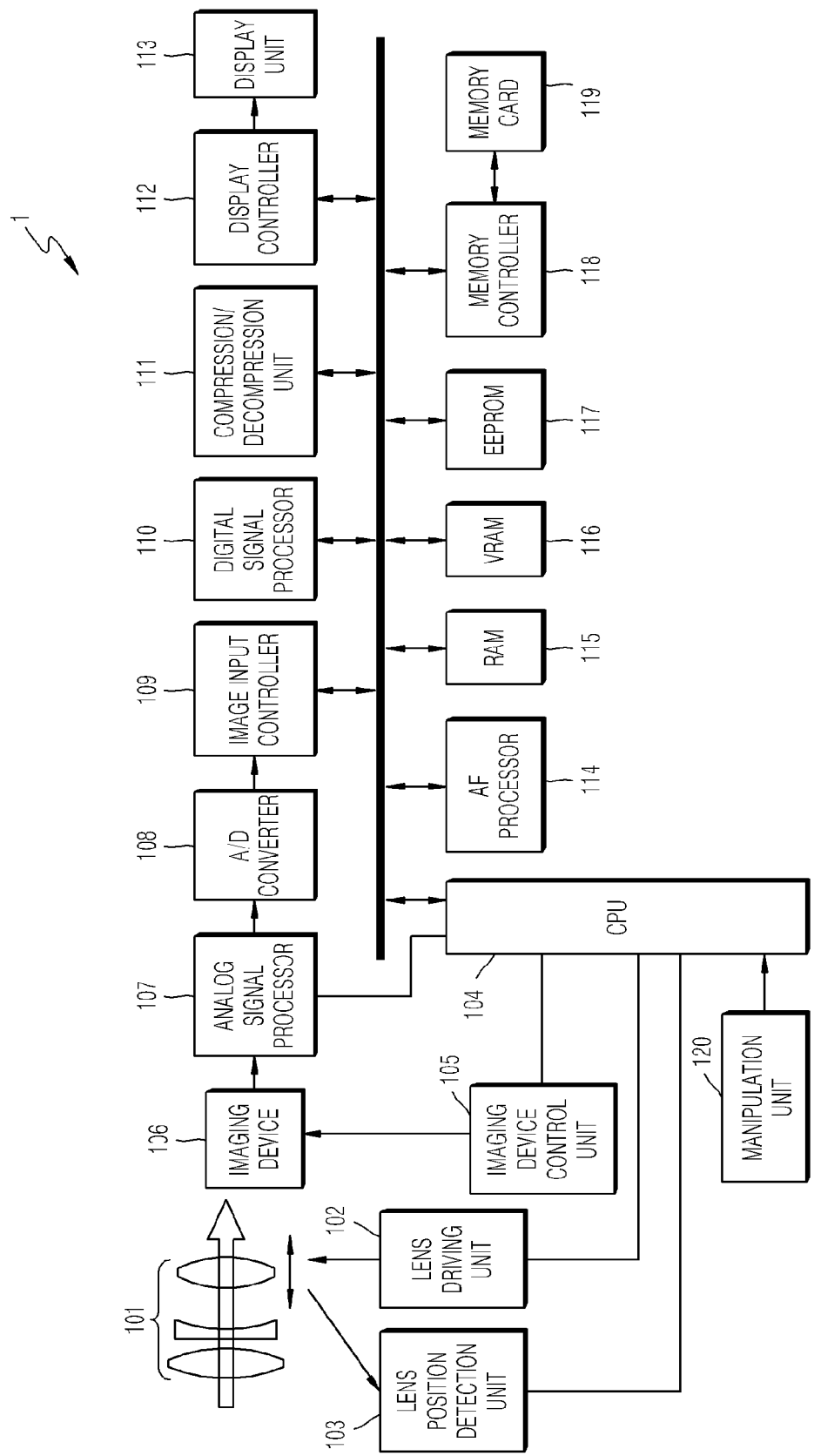
FIG. 1 is a block diagram illustrating a digital photographing apparatus, according to an embodiment.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the embodiments, certain detailed explanations of related art are omitted when it is deemed that they may unnecessarily obscure the invention.

The terms used in the specification are merely used to describe particular embodiments, and are not intended to limit the invention. An expression used in the singular encompasses the expression of the plural, unless it has a clearly different meaning in the context. In the specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Exemplary embodiments will now be described more fully with reference to the accompanying drawings. In the drawings, like reference numerals denote like elements, and thus a detailed description thereof is provided once.

FIG. 1 is a block diagram illustrating a digital photographing apparatus 1, according to an embodiment.

Referring to FIG. 1, the digital photographing apparatus 1 includes a lens 101, a lens driving unit 102, a lens position detection unit 103, a CPU 104, an imaging device control unit 105, an imaging device 106, an analog signal processor 107, an A/D converter 108, an image input controller 109, a digital signal processor 110, a compression/decompression unit 111, a display controller 112, a display unit 113, an autofocus (AF) processor 114, a random access memory (RAM) 115, a video RAM (VRAM) 116, an electrically erasable programmable read-only memory (EEPROM) 117, a memory controller 118, a memory card 119, and a manipulation unit 120.

The lens 101 includes a focus lens and a zoom lens. The lens 101 may adjust a zoom magnification by operating the zoom lens and adjust a focus by operating the focus lens.

The lens driving unit 102 operates the zoom lens and the focus lens of the lens 101, and the CPU 104 controls the operation of the lens driving unit 102. The lens driving unit 102 may include a plurality of motors for operating each of the zoom lens and the focus lens.

The lens position detection unit 103 detects a position of each of the zoom lens and the focus lens to transmit the position information thereof to the CPU 104, The CPU 104 controls an overall operation of the digital photographing apparatus 1. The CPU 104 may receive a manipulation signal from the manipulation unit 120 and transmit commands corresponding to the manipulation signal to each element of the digital photographing apparatus 1.

The imaging device control unit 105 generates a timing signal and transmits the timing signal to the imaging device 106, thereby controlling a photographing operation of the imaging device 106. In addition, the imaging device control unit 105 sequentially reads imaging signals after accumulation of electric charges is completed in each scan line.

The imaging device 106 photographs image light of a subject that has transmitted through the lens 101, thereby generating an image signal. The imaging device 106 may include a plurality of photoelectric conversion devices arranged in a matrix form and charge transfer paths for transferring charges from the photoelectric conversion devices.

The analog signal processor 107 removes noise from an image signal read by the imaging device 106 or amplifies the amplitude of a signal to a certain level. The A/D converter 108 converts an analog image signal that is output from the analog signal processor 107 to a digital image signal.

The image input controller 109 processes an image signal that is output from the A/D converter 108 in order for the image signal to be image processed by each element in subsequent processes. The image signal output from the image input controller 109 may be temporarily stored in the RAM 115.

The image signal output from the image input controller 109 may be subjected to autofocus adjustment by the AF processor 114. Although not illustrated in FIG. 1, separate elements may perform an auto white balance (AWB) operation and an auto exposure (AE) operation. Also, the CPU 104 or the digital signal processor 110 may perform the AWB operation and the AE operation.

The digital signal processor 110 performs a series of image signal processes, for example, gamma correction, on the image signal output from the image input controller 109 so as to produce a live view image or a captured image that is displayable on the display unit 113.

The compression/decompression unit 111 performs compression and decompression on an image signal on which image signal processing has been performed. For example, an image signal is compressed in a compression format, such as a JPEG compression format or an H.264 compression format. An image file, including image data generated by the compression, is transmitted to the memory controller 118, and then transmitted to the memory card 119 and stored therein.

The display controller 112 controls images output to the display unit 113. The display unit 113 displays images, such as a captured image, a live view image, and the like, or a variety of setting information. The display unit 113 and the display controller 112 may include a liquid crystal display (LCD) and an LCD driver, respectively, but are not limited to these examples. For example, the display unit 113 and the display controller may include an organic light-emitting diode display and an operation unit thereof, respectively.

The AF processor 114 performs autofocus adjustment by using an image signal that is output from the image input controller 109. In particular, the AF processor 114 may perform autofocus adjustment by using only an image signal of a portion set as a region to be subjected to autofocus adjustment.

In addition, the AF processor 114 may include a first AF mode that operates when a contrast value of an image of a region subjected to focus adjustment is greater than a reference value and a second AF mode that operates when a contrast value is equal to or less than a reference value. The first AF mode may be a mode for performing a general AF operation, and the second AF mode may be a mode for performing an AF operation for low contrast. In other words, the AF processor 114 may be an example of an apparatus for adjusting AF adjustment. A detailed description of an operation of the second AF mode will be provided below with reference to FIG. 2.

The RAM 115 stores any kinds of data and signals. The VRAM 116 temporarily stores information of an image to be displayed on the display unit 113.

The EEPROM 117 may store an executable program for controlling the digital photographing apparatus 1 or any kind of management information. In addition, the EEPROM 117 may store a luminance correction curve according to an average luminance of an image, which will be described below.

Any kinds of commands from a user for manipulating the digital photographing apparatus 1 are input to the manipulation unit 120. The manipulation unit 120 may include various buttons, for example, a shutter release button, a main switch, a mode dial, and a menu button.

The digital photographing apparatus 1 in which the lens 101 is integrated with a main body is illustrated in FIG. 1, but the invention is not limited thereto. For example, the digital photographing apparatus 1 may be configured such that a lens module, including the lens 101, the lens driving unit 102, and the lens position detection unit 103, is removably attached to the main body.

In the digital photographing apparatus 1 including the lens module that is removably attached to the main body, the lens module may include a control unit. The control unit may operate the lens 101 and detect a position of the lens 101 according to instructions from the CPU 104 of the main body.

Although not illustrated in FIG. 1, the digital photographing apparatus 1 may further include a shutter and an aperture. In FIG. 1, only elements necessary for explaining the embodiment are illustrated, and various elements may be further included.

Figure 2:
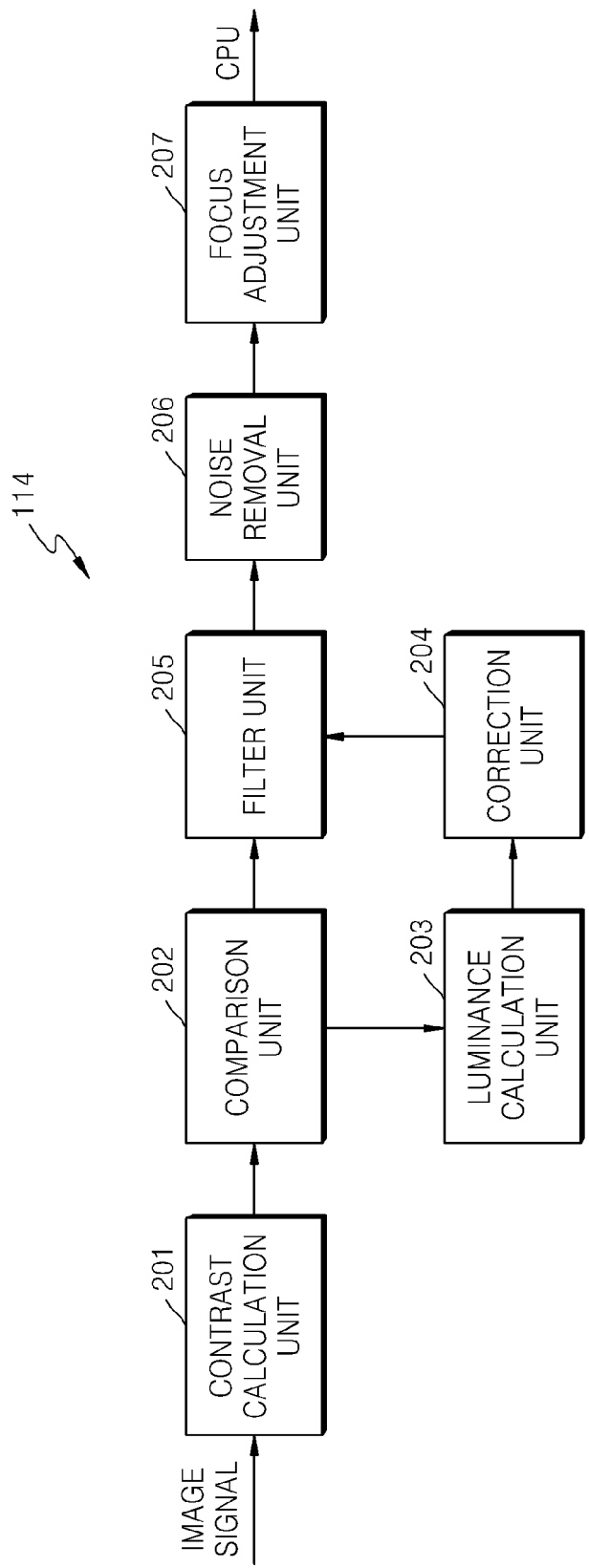
FIG. 2 is a block diagram illustrating a structure of an autofocus (AF) processor of the digital photographing apparatus of FIG. 1, according to an embodiment.

FIG. 2 is a block diagram illustrating a structure of the AF processor 114 of the digital photographing apparatus 1 of FIG. 1, according to an embodiment. FIGS. 3 through 9 are diagrams and graphs for explaining a method of adjusting an autofocus, performed by the AF processor 114, according to embodiments.

Referring to FIG. 2, the AF processor 114 may include a contrast calculation unit 201, a comparison unit 202, a luminance calculation unit 203, a correction unit 204, a filter unit 205, a noise removal unit 206, and a focus adjustment unit 207.

The contrast calculation unit 201 calculates a contrast value of an image from an image signal that is output from the image input controller 109. The calculation of the contrast value may be performed on an entire region of an image and only a region set as a region subjected to focus adjustment.

Figure 3:
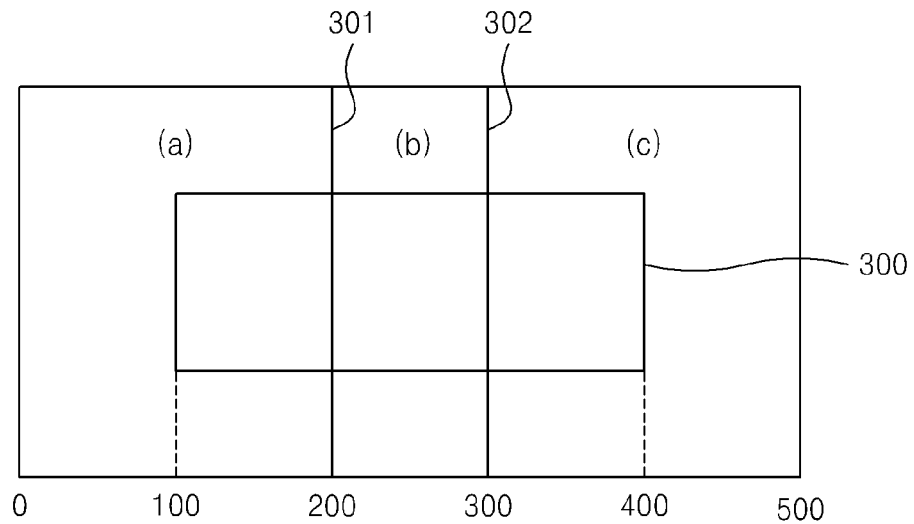
FIG. 3 is a diagram illustrating a captured image, according to an embodiment.

FIG. 3 is a diagram illustrating a captured image, according to an embodiment.

Referring to FIG. 3, the region subjected to focus adjustment is represented by an AF frame 300. In addition, there are a first boundary line 301 between a region (a) and a region (b), and a second boundary line 302 between the region (b) and a region (c). In addition, each region consists of a single color, for example, gray, and it is assumed that a luminance difference between the regions (a), (b), and (c) is very low and the regions (a) and (c) have the same luminance. In this regard, the contrast calculation unit 201 calculates contrast based on luminance differences existing at the first and second boundary lines 301 and 302 of the AF frame 300.

Figure 5:
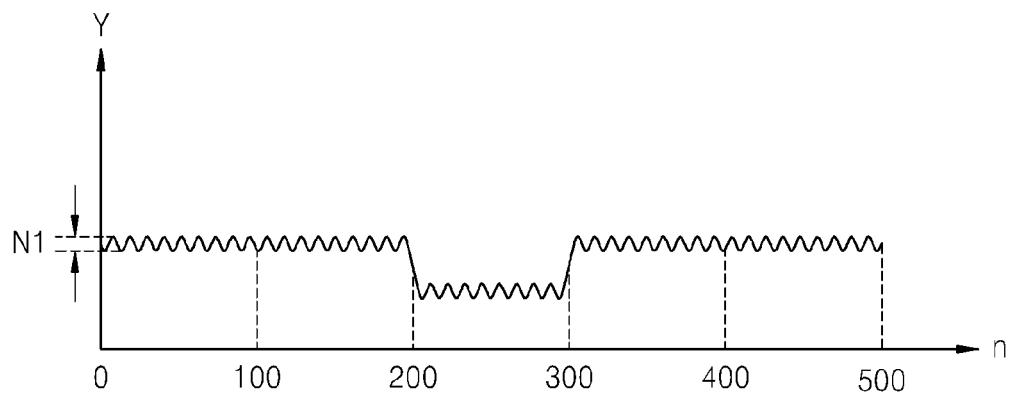
FIG. 5 is a graph illustrating the luminance characteristics of a specific scan line in a captured image, according to an embodiment.

FIG. 5 is a graph illustrating the luminance characteristics of a specific scan line in a captured image, according to an embodiment. In this embodiment, the specific scan line may be a scan line consisting of a region subjected to focus adjustment, e.g., the AF frame 300. In FIG. 5, a horizontal axis n denotes a pixel position and a vertical axis Y denotes a luminance.

Referring to FIG. 4, luminance decreases at positions of the first and second boundary lines 301 and 302 (as shown in FIG. 3). In addition, luminance values of pixels are not constant by a first noise N1 and a certain extent of difference occurs therebetween.

The comparison unit 202 compares the calculated contrast value of an image with a predetermined reference value. The reference value is a value that determines whether the AF processor 114 performs a general AF operation or an AF operation for low contrast.

The comparison unit 202 determines that if the calculated contrast value of an image is greater than the reference value, it is easy to detect a focus from a captured image, whereby an AF operation is performed by a general method.

On the other hand, the comparison unit 202 determines that if the calculated contrast value of an image is equal to or less than the reference value, it is difficult to detect a focus from a captured image, whereby the captured image is subjected to low contrast correction processing.

Figure 4A:
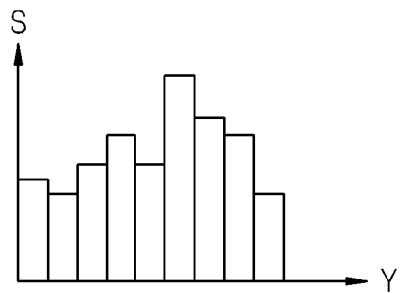
FIG. 4A is a histogram of a general image.
Figure 4B:
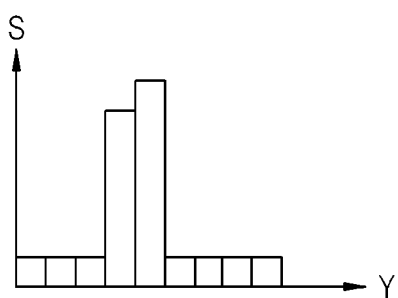
FIG. 4B is a histogram of a low-contrast image, according to an embodiment.

FIG. 4A is a histogram of a general image and FIG. 4B is a histogram of a low-contrast image, according to an embodiment. In FIGS. 4A and 4B, a horizontal axis Y denotes a luminance and a vertical axis S denotes the number of pixels having a corresponding luminance.

Referring to FIG. 4A, pixels are distributed over a wide range of luminance. That is, FIG. 4A illustrates a luminance distribution in a general image.

Referring to FIG. 4B, pixels are distributed concentratively in a certain range of luminance. That is, FIG. 4B illustrates a luminance distribution in an image having a low contrast value due to a small change in luminance.

Thus, the contrast calculation unit 201 may calculate the histogram with respect to the luminance distribution described above, which is replaced as a contrast value. The comparison unit 202 may determine whether a contrast value of an image is equal to or less than a reference value by using the calculated histogram. For example, if a standard deviation of the histogram is equal to or less than a threshold value, it may be determined that a contrast value is equal to or less than a reference value.

However, the invention is not limited to the above example in which the contrast calculation unit 201 calculates a histogram and the comparison unit 202 determines whether a contrast value of an image is equal to or less than a reference value from the histogram. For example, the contrast calculation unit 201 may calculate a contrast value by using luminance data obtained when automatic light metering is performed, and the comparison unit 202 may compare the calculated contrast value with a reference value.

If the calculated contrast value is equal to or less than a reference value, the luminance calculation unit 203 calculates an average luminance of image signals input to the AF processor 114. In this regard, like the contrast calculation unit 201, an average luminance with respect to regions set as a region subjected to focus adjustment may be calculated or an average luminance with respect to an entire region of an image may be calculated.

The correction unit 204 corrects a luminance of an input image signal if a contrast value is equal to or less than a reference value. The correction of luminance may be determined according to the calculated average luminance of an image. Therefore, the correction unit 204 may generate a luminance correction curve with respect to the average luminance. In this regard, the correction unit 204 may import and use a necessary luminance correction curve among luminance correction curves according to an average luminance that are previously stored in the EEPROM 117 or may generate a necessary luminance correction curve through internal calculation.

Figure 6:
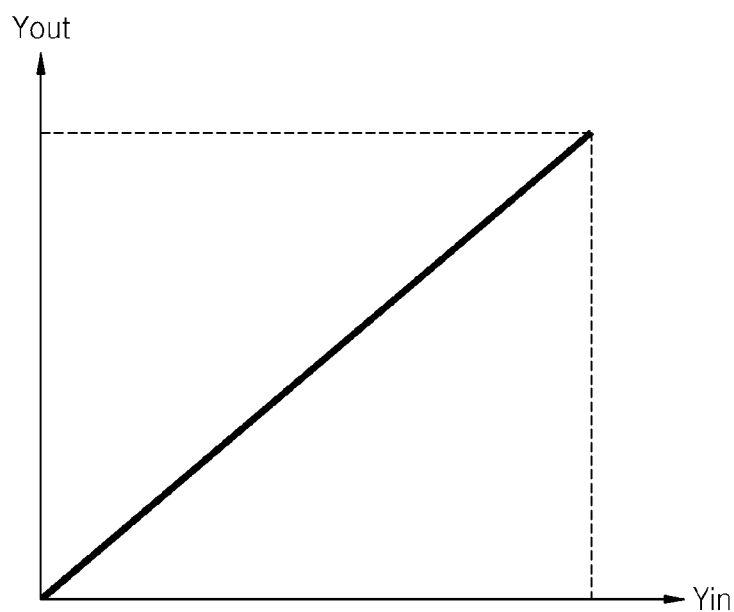
FIG. 6 is a graph showing luminance correction of a general image signal.
Figure 7A:
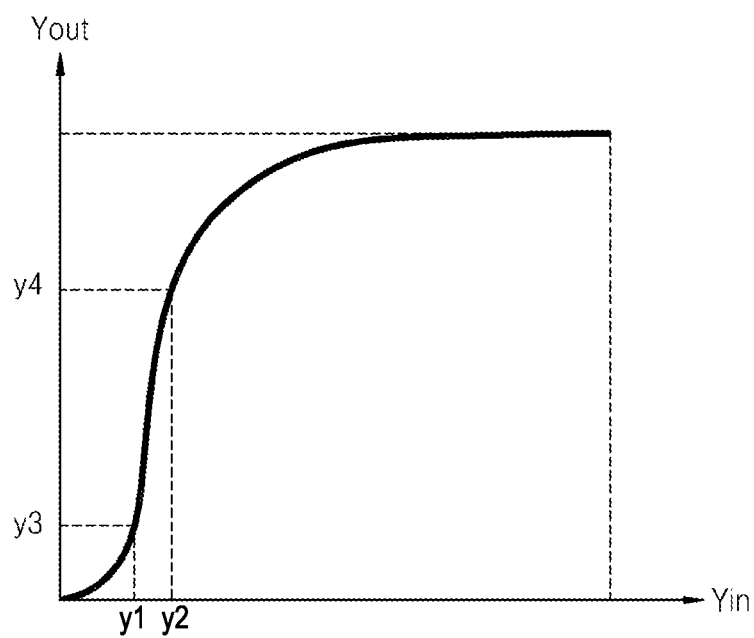
FIGS. 7A through 7C are graphs showing luminance correction curves, according to embodiments.
Figure 7B:
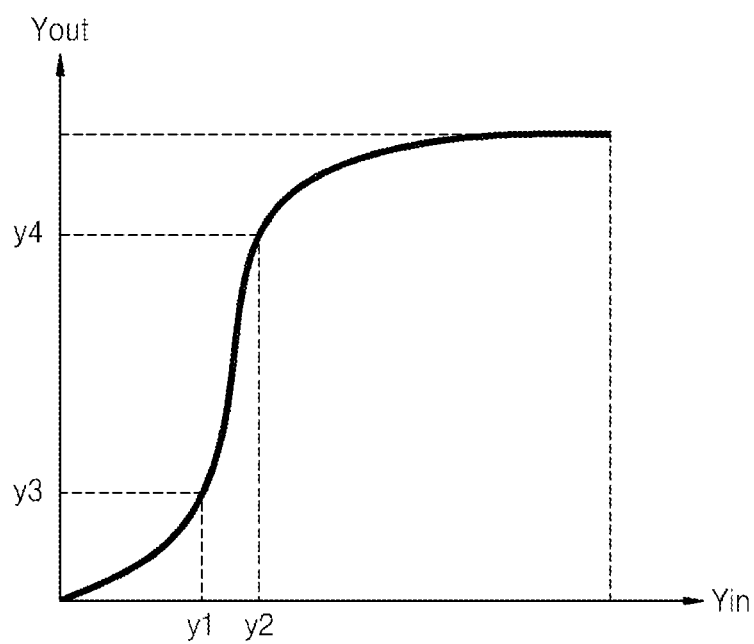
Figure 7C:
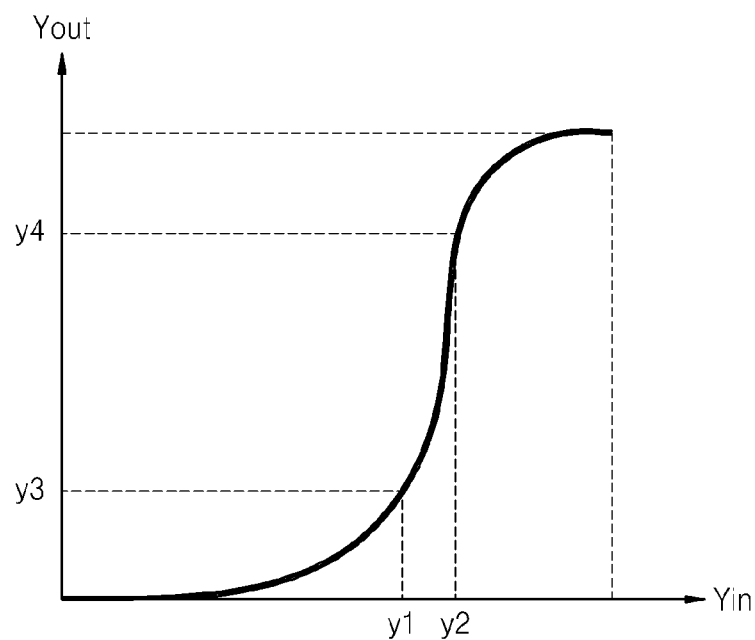

FIG. 6 is a graph showing luminance correction of a general image signal, and FIGS. 7A through 7C are graphs showing luminance correction curves, according to embodiments. In FIG. 6 and FIGS. 7A through 7C, a horizontal axis Yin denotes a luminance of an input signal and a vertical axis Yout denotes a luminance of an output signal.

Referring to FIG. 6, the input signal and the output signal change linearly. In other words, if a contrast value is greater than a reference value, it is easy to detect a focus and thus it is unnecessary to correct luminance. Therefore, if a contrast value is greater than a reference value, there is no need to use the luminance correction curve illustrated in FIG. 6 and the image signal input from the image input controller 109 is used as it is.

Referring to FIGS. 7A through 7C, an output signal changes variously with respect to an input signal. In particular, in a section from y1 to y2, the output signal rapidly changes with respect to the input signal, as in a section from y3 to y4. That is, a curve has a steep slope. In this regard, a section from y1 to y2 is a region including an average luminance of an image. In FIGS. 7A through 7C, FIG. 7A illustrates a case in which the average luminance of an image is the lowest and FIG. 7C illustrates a case in which the average luminance of an image is the highest.

To increase the contrast of an image having a low contrast value, correction needs to be performed so that a luminance difference between pixels distributed around an average luminance is large. Thus, in the luminance correction curve, a change amount of the output signal with respect to the input signal increases with respect to an average luminance and a luminance therearound. In contrast, a change amount of the output signal with respect to the input signal decreases in the remaining regions.

Figure 8:
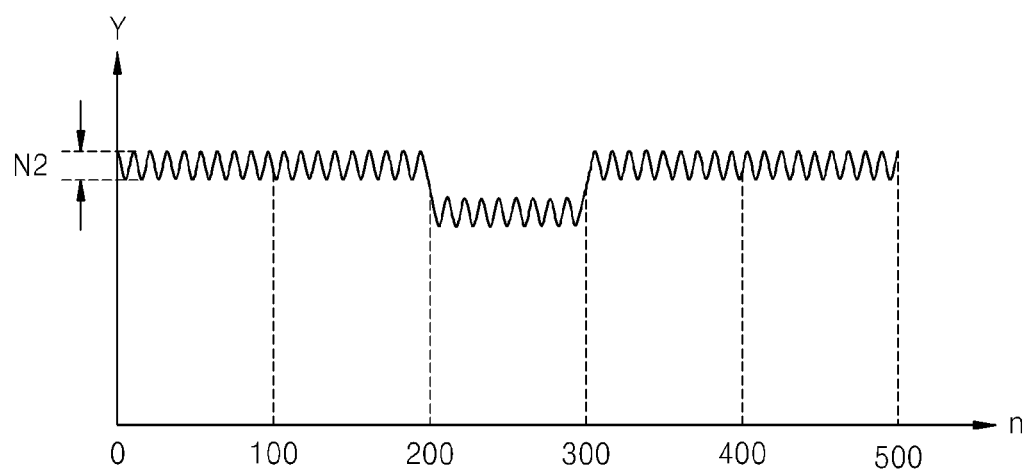
FIG. 8 is a graph showing the luminance characteristics after luminance correction with respect to an image signal of the scan line of FIG. 5, according to an embodiment.

FIG. 8 is a graph showing the luminance characteristics after luminance correction with respect to an image signal of the scan line of FIG. 5, according to an embodiment. In FIG. 8, a horizontal axis n denotes a pixel position and a vertical axis Y denotes a luminance.

Referring to FIG. 8, luminance differences at the first boundary line 301 and the second boundary line 302 (as shown in FIG. 3) are larger as compared to FIG. 5. In addition, a noise value increases to a first noise N2, which is larger than the first noise N1 of FIG. 5.

The filter unit 205 performs a filtering process on an image signal on which luminance correction has been performed using a luminance correction curve because a contrast value is equal to or less than a reference value or on an image signal on which luminance correction is not performed because a contrast value is greater than a reference value.

A first cut-off frequency of the filter unit 205, which is used in the first AF mode, may be arbitrarily set. A second cut-off frequency of the filter unit 205, which is used in the second AF mode, is set lower than the first cut-off frequency. The second cut-off frequency may vary according to a reference value used to determine a low contrast. In this regard, the second cut-off frequency changes such that as the reference value decreases, the second cut-off frequency decreases.

In general, noise components of an image signal are mainly in a high frequency region. On the other hand, in exemplary embodiments, a low-contrast image has a large number of low frequency components. Thus, if the second cut-off frequency is set lower than the first cut-off frequency, the number of image signals that are additionally transmitted by cut-off frequency variation is relatively larger than the amount of noise components that are additionally transmitted. This may improve a ratio of signal to noise (S/N).

The noise removal unit 206 removes noise with respect to a filtered image signal. For example, the noise removal unit 206 may remove a noise by using various known noise removal methods such as coring, and the like.

The focus adjustment unit 207 adjusts a focus by using a contrast value that is calculated from an image signal from which a noise is removed. In other words, the focus adjustment unit 207 detects a peak position of the contrast value.

Figure 9:
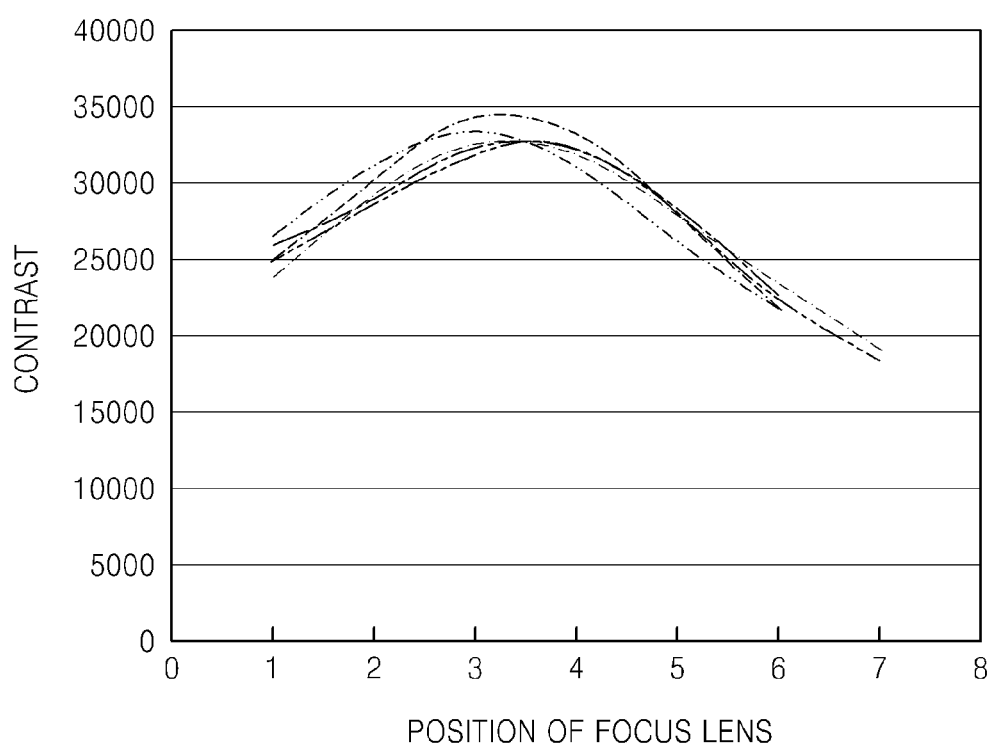
FIG. 9 illustrates plots showing contrast peak detection results obtained by performing a method of adjusting an autofocus, according to an embodiment.

FIG. 9 illustrates plots showing contrast peak detection results obtained by performing a method of adjusting an autofocus, according to an embodiment. In FIG. 9, a horizontal axis denotes a position of a focus lens and a vertical axis denotes a contrast value.

Referring to FIG. 9, results of repeatedly performing an AF operation for low contrast on the image as illustrated in FIG. 3 five times are illustrated. Since a contrast value of an image is small, it is not easy to detect a focus, conventionally. However, as illustrated in FIG. 9, a peak of a contrast value appears at a position between 3 and 4 of the horizontal axis. That is, significantly accurate focus detection may be performed.

Figure 10:
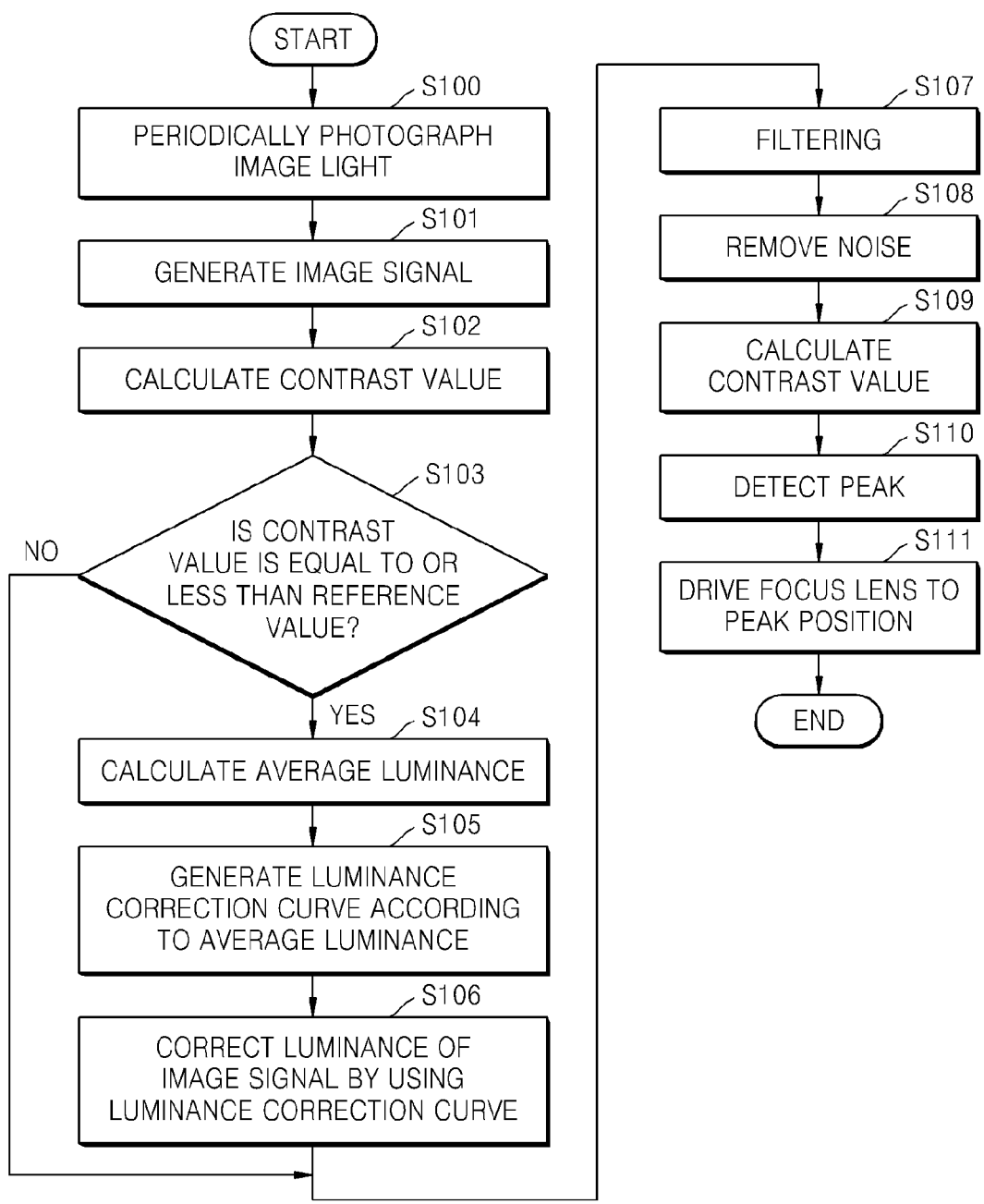
FIG. 10 is a flowchart illustrating a method of adjusting an autofocus, according to an embodiment.

FIG. 10 is a flowchart illustrating a method of adjusting an autofocus, according to an embodiment.

Referring to FIG. 10, an image light is periodically photographed by an imaging device 106 (operation S100). An image signal is generated therefrom (operation S101). The generated image signal is image processed, thereby being used as a live view image.

For an AF operation, the contrast calculation unit 201 calculates a contrast value from the generated image signal (operation S102). The comparison unit 202 determines whether the calculated contrast value is equal to or less than a reference value (operation S103).

If the contrast value is equal to or less than the reference value, a second AF operation is performed. In detail, the luminance calculation unit 203 calculates an average luminance of images (operation S104), and the correction unit 204 generates a luminance correction curve according to the calculated average luminance (operation S105). In addition, the correction unit 204 corrects the luminance of the image signal by using the generated luminance correction curve (operation S106).

If the contrast value is equal to or less than the reference value, a first AF operation is performed. That is, a general AF operation is performed, and operations S104 through S106 are skipped.

A filtering operation is performed by the filter unit 205 on a luminance-adjusted image signal or an image signal determined to be subjected to the first AF operation (operation S107). A cut-off frequency of the filter unit 205 is already described above and thus a detailed description thereof is not provided herein.

The noise removal unit 206 removes noise of the filtered image signal (operation S108), and the focus adjustment unit 207 calculates a contrast value of the noise-removed image (operation S109). A peak is detected based on the calculated contrast value (operation S110), and a focus lens is driven to a position corresponding to the detected peak (operation S111).

The focus adjustment operation is thus completed.

As described above, according to the one or more embodiments of the invention, by using an apparatus for adjusting an autofocus and a digital photographing apparatus including the same, autofocus adjustment may be accurately performed even on a low-contrast image.

All references, including publications, patent applications, and patents, cited herein are hereby incorporated by reference to the same extent as if each reference were individually and specifically indicated to be incorporated by reference and were set forth in its entirety herein.

The exemplary embodiments shown and described herein are illustrative examples of the invention and are not intended to otherwise limit the scope of the invention in any way. For the sake of brevity, conventional electronics, control systems, software, and other functional aspects of the systems may not be described in detail. Furthermore, the connecting lines or connectors shown in the various figures presented are intended to represent exemplary functional relationships and/or physical or logical connections between the various elements. It should be noted that many alternative or additional functional relationships, physical connections, or logical connections may be present in a practical device. Moreover, no item or component is essential to the practice of the invention unless the element is specifically described as "essential" or "critical."

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

It will be recognized that the terms "comprises," "comprising," "includes," "including," "has," and "having," as used herein, are specifically intended to be read as open-ended terms of art. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples or exemplary language (e.g., "such as") provided herein, is intended merely to better illuminate the invention and does not pose a limitation on the scope of the invention unless otherwise claimed. Moreover, it is well understood by one of ordinary skill in the art that numerous modifications, adaptations, and changes may be made under design conditions and factors without departing from the spirit and scope of the invention as defined by the following claims and within the range of equivalents thereof.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An apparatus for adjusting an autofocus, the apparatus comprising:
    an imaging device that photographs light from a subject so as to generate an image signal;
    a contrast calculation unit that calculates a first contrast value of an image from the image signal;
    a correction unit that corrects a luminance of the image signal if the calculated first contrast value is equal to or less than a reference value; and
    a focus adjustment unit that adjusts a focus by using a second contrast value that is calculated from the corrected image signal.

2. The apparatus of claim 1, wherein the correction unit corrects the luminance of the image signal according to an average luminance of the image.

3. The apparatus of claim 2, wherein the correction unit generates a luminance correction curve according to the average luminance and corrects the luminance of the image signal according to the generated luminance correction curve.

4. The apparatus of claim 3, wherein a slope of an output signal with respect to an input signal of the luminance correction curve is steep in a region of the average luminance.

5. The apparatus of claim 2, further comprising a luminance calculation unit that calculates the average luminance.

6. The apparatus of claim 5, wherein the luminance calculation unit calculates the average luminance with respect to an image of a region subjected to focus adjustment.

7. The apparatus of claim 1, wherein the first contrast value is calculated using luminance data obtained from automatic light metering.

8. The apparatus of claim 1, wherein the first contrast value is calculated from a histogram with respect to luminance distribution.

9. The apparatus of claim 1, further comprising a filter unit that performs a filtering process on the corrected image signal.

10. The apparatus of claim 9, wherein a cut-off frequency of the filter unit varies according to the reference value.

11. The apparatus of claim 10, wherein the cut-off frequency decreases as the reference value decreases.

12. The apparatus of claim 1, further comprising a noise removal unit that removes noise from the corrected image signal.

13. A method of controlling an apparatus for adjusting an autofocus, the method comprising:
    photographing light from a subject so as to generate an image signal;
    calculating a first contrast value of an image from the image signal;
    correcting a luminance of the image signal if the calculated first contrast value is equal to or less than a reference value; and
    adjusting a focus by using a second contrast value that is calculated from the corrected image signal.

14. The method of claim 13, further comprising calculating an average luminance from the generated image signal.

15. The method of claim 14, wherein the correcting of the luminance of the image signal comprises generating a luminance correction curve according to the average luminance and correcting the luminance of the image signal according to the generated luminance correction curve.

16. The method of claim 15, wherein the correcting is performed such that a slope of an output signal with respect to an input signal is steep in a region of the average luminance.

17. An apparatus for adjusting an autofocus, the apparatus comprising:
    an imaging device that photographs light from a subject so as to generate an image signal;
    a contrast calculation unit that calculates a contrast value of an image from the image signal;
    a comparison unit that compares the calculated contrast value with a reference value; and
    a focus adjustment unit comprising a first autofocus mode that performs a general autofocus operation if the contrast value is greater than a reference value and a second autofocus mode that performs an autofocus operation for low contrast if the contrast value is equal to or less than a reference value.

18. The apparatus of claim 17, further comprising a correction unit that corrects the luminance of the image signal in the second autofocus mode.

19. The apparatus of claim 18, further comprising a luminance calculation unit that calculates the average luminance, wherein the correction unit corrects the luminance of the image signal according to the average luminance of an image.

20. The apparatus of claim 19, wherein the correction unit generates a luminance correction curve according to the average luminance and corrects the luminance of the image signal according to the generated luminance correction curve.

* * * * *